July 11, 1967  B. R. WINBORN  3,330,500
PROPULSIVE WING AIRPLANE
Filed March 22, 1965  4 Sheets-Sheet 1

BYRON R. WINBORN
INVENTOR

BY Robert M. Sperry
ATTORNEY

July 11, 1967

B. R. WINBORN 3,330,500

PROPULSIVE WING AIRPLANE

Filed March 22, 1965

BYRON R. WINBORN
INVENTOR

BY Robert M. Sperry
ATTORNEY

July 11, 1967

B. R. WINBORN 3,330,500

PROPULSIVE WING AIRPLANE

Filed March 22, 1965

BYRON R. WINBORN
INVENTOR

BY Robert M. Sperry
ATTORNEY

United States Patent Office 3,330,500
Patented July 11, 1967

3,330,500
PROPULSIVE WING AIRPLANE
Byron R. Winborn, Irving, Tex., assignor to LTV Aerospace Corporation, Dallas, Tex., a corporation of Delaware
Filed Mar. 22, 1965, Ser. No. 441,525
7 Claims. (Cl. 244—12)

This invention relates to airplanes and is particularly directed to airplanes having a high bypass ratio turbofan in a propulsive wing.

It has long been known that high bypass ratio turbofans are superior in performance to other propulsive systems at high subsonic velocities. However, such turbofans are extremely bulky and the drag penalty imposed by conventional packaging techniques, such as pods, nacelles and the like, have more than offset the advantages of such propulsive systems. In addition, propulsive wing airplanes have been proposed frequently, heretofore, but have generally been aerodynamically or structurally unsound. Consequently, neither high bypass ratio turbofans nor propulsive wing airplanes have gained wide acceptance.

These disadvantages of the prior art are overcome with the present invention, and a novel airplane design is provided which combines the advantages of high bypass ratio turbofans and propulsive wings and obtains several additional benefits from the combination resulting in a unique airplane which can land and take off vertically with a smooth, continuous transition between hover mode and winged flight mode and having extremely high performance capability in its winged flight mode.

The advantages of the present invention are preferably attained by providing an airplane having a fuselage; gas generator means mounted in said fuselage; a pair of ducted wing means mounted on respective sides of said fuselage, the upper portions of the ducts of each of said wing means forming upper airfoils, the lower portions of the ducts of each of said wing means forming lower airfoils, and boom means connecting said upper airfoils to said lower airfoils; fan means mounted in the ducts of each of said wing means adjacent the leading edge thereof; turbine means mounted aft of said fan means; shaft means connecting said turbine means to drive said fan means; and means coupling said gas generator means to drive said turbine means. By providing movable deflecting vanes in the air ducts aft of the fans, VTOL capability can be achieved with a smooth, continuous transition between the hover mode and winged flight mode. Moreover, by directing the turbine and fan exhausts in a specific manner, the performance of the airplane is greatly enhanced and drag divergence at near subsonic speeds is sharply reduced.

Accordingly, it is an object of the present invention to provide an improved design for airplanes.

Another object of the present invention is to provide an improved airplane design embodying a high bypass ratio turbofan in a propulsive wing.

An additional object of the present invention is to provide an improved design for an airplane having VTOL capability with smooth, continuous transition between hover mode and winged flight mode.

A further object of the present invention is to provide an improved design for an airplane having relatively high Mach number for drag divergence.

A specific object of the present invention is to provide an airplane having a fuselage; a gas generator means mounted in said fuselage; a pair of ducted wing means mounted on respective sides of said fuselage, the upper portions of the ducts of each of said wing means forming upper airfoils, the lower portions of the ducts of each of said wing means forming lower airfoils; and boom means connecting said upper airfoils to said lower airfoils; fan means mounted in the ducts of each of said wing means adjacent the leading edge thereof; turbine means mounted aft of said fan means; shaft means connecting said turbine means to drive said fan means; and means coupling said gas generator means to drive said turbine means.

These and other objects and features of the present invention will be apparent from the following detailed description taken with reference to the figures of the accompanying drawings.

Figures 1, 2:
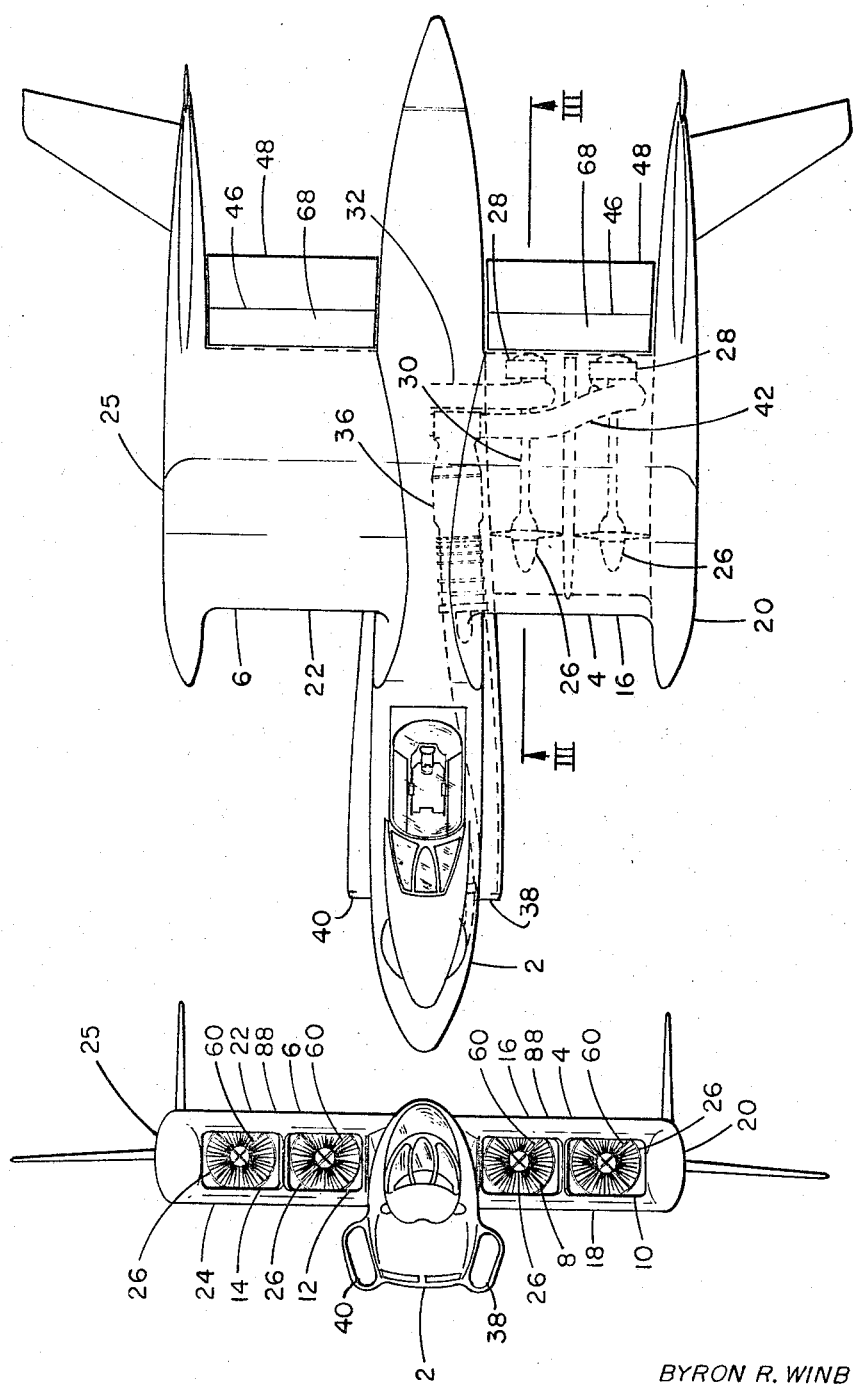
FIGURE 1 is a plan view of an airplane embodying the present invention.
FIGURE 2 is a front elevation of the airplane of FIGURE 1.
Figure 3:
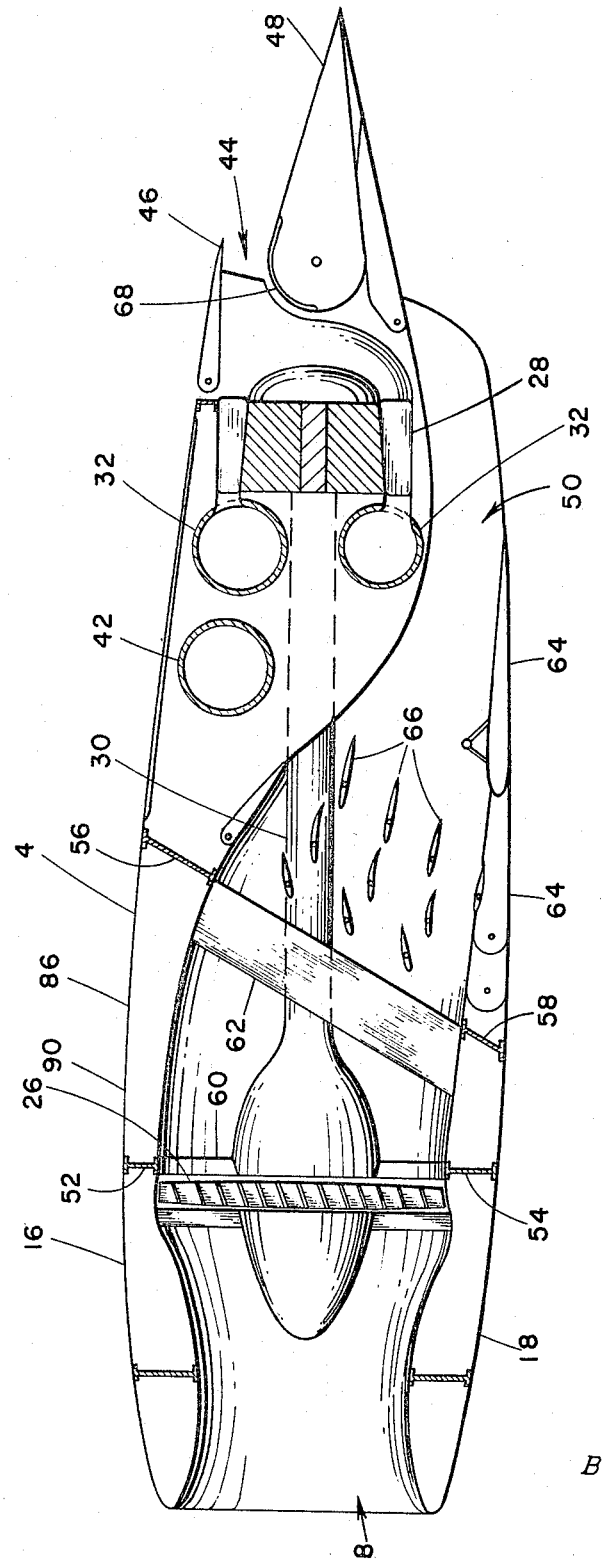
FIGURE 3 is a section through a wing of the airplane of FIGURE 1, taken on the line III—III thereof.

In that form of the present invention chosen for purposes of illustration in the drawings, FIGURE 1 shows an airplane having a fuselage 2 and a pair of ducted wings, indicated at 4 and 6, secured to respective sides of the fuselage 2. As best seen in FIGURES 2 and 3, the wings 4 and 6 are formed of a plurality of air ducts 8, 10, 12 and 14. The upper portions of air ducts 8 and 10 cooperate to form the upper airfoil 16 of wing 4, while the lower portions of air ducts 8 and 10 cooperate to form the lower airfoil 18 of wing 4. The airfoils 16 and 18 are connected at their outer ends by a boom 20 to form ducted wing 4. Similarly, the upper portions of air ducts 12 and 14 cooperate to form the upper airfoil 22 of wing 6, while the lower portions of air ducts 12 and 14 cooperate to form the lower airfoil 24 of wing 6 and a boom 25 connects the outer ends of airfoils 22 and 24 to form ducted wing 6.

The air ducts 8, 10, 12 and 14 are identical and, as seen in FIGURE 3, each has a fan 26 mounted within the air duct adjacent the forward end thereof. The fan 26 is driven by a turbine 28, through shaft 30 or the like, and turbine 28 is driven by hot gas from a gas generator mounted in the fuselage 2 through a gas duct, such as duct 32. In order to provide two-engine safety, while assuring the balanced power which is essential for VTOL operation, two gas generators are mounted in the fuselage 2, as indicated in dotted lines at 36 in FIGURE 1, and are connected to receive air from air intakes 38 and 40. The hot gas from gas generator 34 is supplied through gas ducts 32 to drive the turbines 28 in the inboard air ducts 8 and 12. Similarly, the hot gas from gas generator 36 is supplied through gas ducts 42 to drive the turbines 28 in the outboard air ducts 10 and 14. From the turbines 28, the hot gas is exhausted through ports 44 in the training edge 46 of wing 6 and passes over the upper surface of a deflectable flap 48 to provide propulsive thrust. At the same time, air passing through the ducts 8, 10, 12 and 14 will be accelerated by the fans 26 and will be exhausted through opening 40, between upper airfoil 22 and lower airfoil 24, to provide additional propulsive thrust. As noted above, the design of the present invention is particularly useful with high bypass ratio turbofans, and it is found that bypass ratios of about 6 to 11 are preferred. At lower bypass ratios, the weight of the gas generators becomes excessive, while at higher ratios, the increase in wetted surface and in weight of the propulsive wing affects any further gain.

To provide strength for the wings 4 and 6, structural beam cap strips 52, 54, 56, and 58 are connected to the airframe and extend spanwise of the wings 4 and 6. In addition, diagonal strut members 60 and 62 are provided to connect upper airfoil 16 with lower airfoil 18, intermediate the ends thereof, and to form extremely rugged torque boxes for the wings 4 and 6. As shown, strut member 60 connects ribs 52 and 54, while strut member 62 connects ribs 56 and 58. The strut members 60 and 62 extend the entire length of the wings 4 and 6 and those portions of the struts 60 and 62 which extend across the air ducts 8, 10, 12 and 14 are formed to serve as flow straighteners for air passing the through ducts, as best seen in FIGS. 2 and 3.

Figure 4:
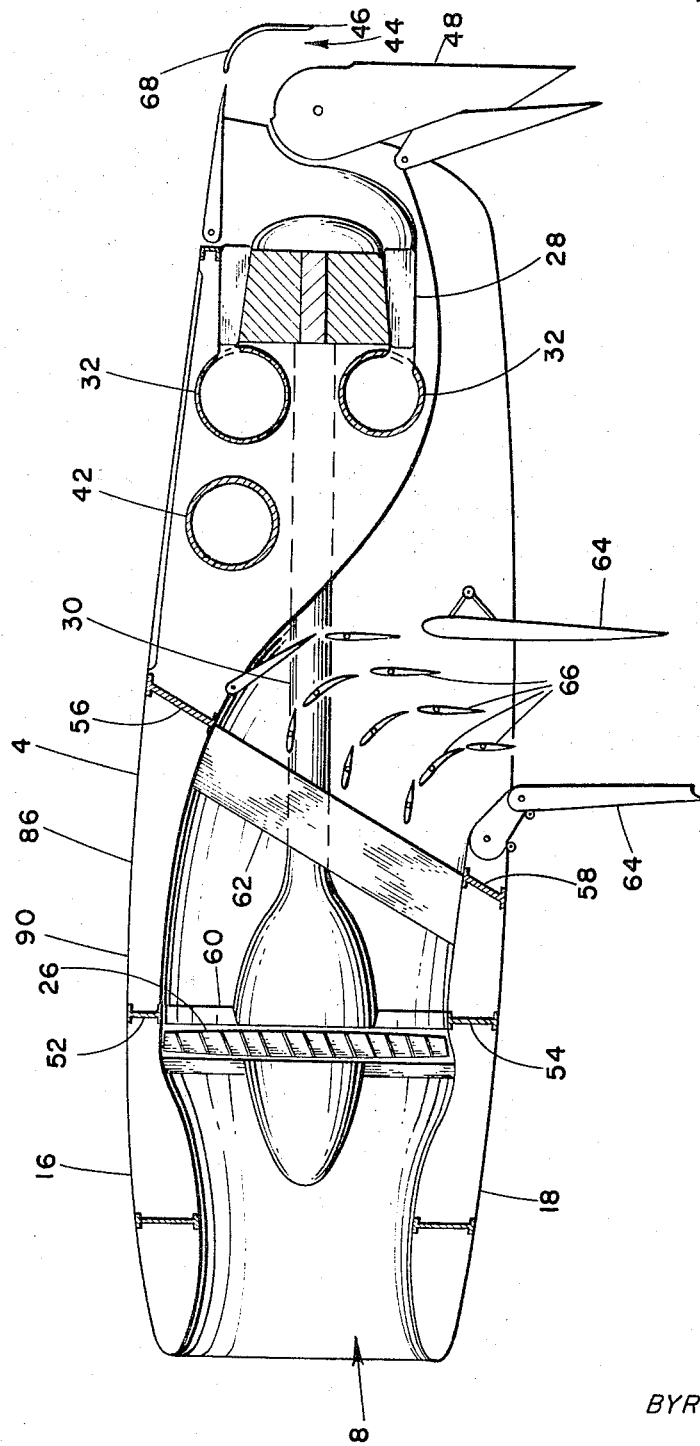
FIGURE 4 is a view, similar to that of FIGURE 3, showing the deflecting vanes positioned for hover mode.

As seen in FIGURES 3 and 4, doors 64 are provided in the lower airfoil 24 and a cascade of movable deflecting vanes 66 are positioned extending across the air ducts 8, 10, 12 and 14. A detailed discussion of the structure and function of the deflecting vanes 66 may be found in the copending application of Jesse J. Santamaria and Bryon R. Winborn, Ser. No. 439,161, filed Mar. 12, 1965, entitled "Variable Flow Deflection Means." For purposes of the instant application, it can be seen that with the doors 64 and vanes 66 in the positions illustrated in FIGURE 3, air driven by the fans 26 will be directed rearwardly to provide forward thrust for winged flight operation; whereas, with the doors 64 and vanes 66 in the positions illustrated in FIGURE 4, the air from fans 26 will be directed downward to provide upward thrust for VTOL operation. Moreover, with the wing structure described hereinabove, it will be seen that the doors 64 and vanes 66 can be made to a smooth, gradual transition between winged flight mode and hover mode with no "step-wise" transition as is encountered in VTOL airplanes having vertically oriented lift fans. By providing a deflectable lip, as indicated at 68, on the trailing edge 46 of wing 6 and suitably positioned flap 48, the exhaust from turbines 28 may be deflected, as desired, to augment the thrust from fans 26 to enhance the performance of the airplane. With this arrangement, the pilot has full control of the airplane throughout the complete transition. Furthermore, since no rotation of large heavy components, such as engines or wings, is required, thrust vectoring can be accomplished quite rapidly. This can be used to provide highly effective braking action and makes possible maneuvers which have not been possible with any previous airplane.

As best seen in FIGURES 1 and 2, the airplane design described above permits the use of a plurality of high bypass ratio turbofans in a configuration which is aerodynamically clean and has a relatively small wetted surface. Accordingly, the drag of the airplane of the present invention is substantially reduced. Moreover, several other advantages are obtained with the design of the present invention.

Figure 5:
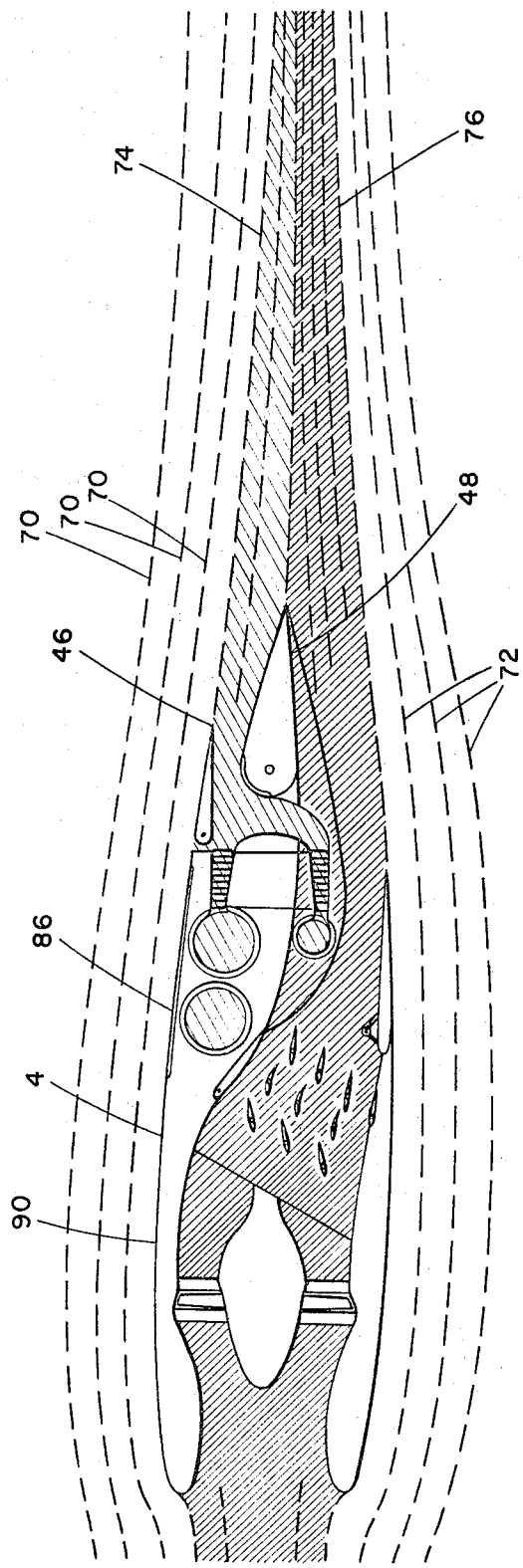
FIGURE 5 is a diagrammatic representation showing the air flows about the wing of the airplane of FIGURE 1.

As indicated in FIGURE 5, the air flows 70 and 72, respectively above and below wing 6 are prevented from recombining for a substantial distance aft of the trailing edge 44 of wing 6 because of a high pressure "core" formed by the turbine exhaust, indicated at 74 and the accelerated air from the fans, indicated at 76. It is found that this high pressure core functions as an effective extension of the wing 6 and a substantial increase in lift is achieved from this without the drag penalty which would be associated with a conventional wing having an area equal to this effective wing area.

Figure 6:
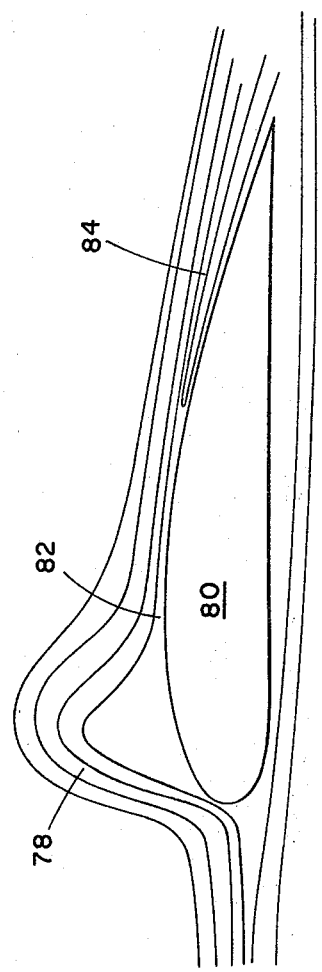
FIGURE 6 is a diagrammatic representation showing the air flows about the wing of a conventional airplane at near subsonic speeds.

Furthermore, as a conventional airplane approaches sonic velocity, an area of supersonic air is created, as indicated at 78 in FIG. 6, adjacent the leading edge of the wing 80. This supersonic area 78 spreads rearwardly as the speed of the airplane increases. However, when the supersonic area 78 reaches the crest 82 of wing 80 and faces the adverse pressure gradient aft of the crest 82, a normal shock wave forms at the crest 82 and the boundary layer 84 begins to thicken rapidly, causing a sharp increase in drag, shock-induced flow separation and, possibly, stalling. However, as seen in FIGURE 3 and 5, the upper surfaces 86 and 88 of wings 4 and 6 of the airplane of the present invention, are formed relatively flat from the crest 90 to the trailing edge 46. Consequently, the "effective" crest occurs close to the trailing edge 46. At the same time, high pressure air, from turbine 28, is exhausted between the trailing edge 46 of wings 4 and 6 and flaps 48. It is found that this high pressure air, exhausted slightly aft of the effective crest, serves to substantially retard the formation and spread of a stagnation area at near subsonic speeds causing a very significant reduction in drag.

Obviously, numerous variations and modifications may be made without departing from the present invention. Accordingly, it should be clearly understood that the form of the invention described above and shown in the figures of the accompanying drawings is illustrative only and is not intended to limit the scope of the present invention.

What is claimed is:

1. An airplane comprising:
   a fuselage;
   gas generator means mounted in said fuselage;
   a pair of ducted wing members of substantially uniform depth throughout the span thereof and having the chord thereof considerably greater than the diameter of the ducts mounted on respective sides of said fuselage, the upper portions of the ducts of each of said wing members forming an upper airfoil having an aerodynamically clean upper surface, the lower portions of said ducts forming a lower airfoil having an aerodynamically clean lower surface, and means connecting said upper airfoils to said lower airfoils;
   fan means mounted in each of said ducts adjacent the leading edge thereof;
   turbine means mounted aft of said fan means;
   means connecting said turbine means to drive said fan means; and
   means connecting said gas generator means to drive said turbine means.

2. An airplane comprising:
   a fuselage;
   a pair of ducted wing members of substantially uniform depth throughout the span thereof and having the chord thereof considerably greater than the diameter of the ducts mounted on respective sides of said fuselage;
   a plurality of high bypass ratio turbofans, each of said turbofans being mounted within a respective duct within said wing members;
   gas generator means mounted within said fuselage; and
   means connecting said gas generator means to drive said turbofans.

3. An airplane comprising:
   a fuselage;
   gas generator means mounted in said fuselage;
   a pair of ducted wing members of substantially uniform depth throughout the span thereof and having the chord thereof considerably greater than the diameter of the ducts mounted on respective sides of said fuselage, the upper portions of the ducts of each of said wing members forming an upper airfoil having an aerodynamically clean upper surface, the lower portions of said ducts forming a lower airfoil having an aerodynamically clean lower surface, and means connecting said upper airfoils to said lower airfoils;
   deflectable flap means mounted adjacent the trailing edges of each of said upper airfoils;
   fan means mounted in each of said ducts adjacent the leading edge thereof and driving air between said flap means and said lower airfoils;
   turbine means mounted aft of said fan means and exhausting hot gas between said upper airfoil and said flap means;

means connecting said turbine means to drive said fan means; and means connecting said gas generator means to drive said fan means.

4. An airplane comprising:

a fuselage;

a pair of ducted wing members of substantially uniform depth throughout the span thereof and having the chord thereof considerably greater than the diameter of the ducts mounted on respective sides of said fuselage, the upper portions of the ducts of each of said wing members forming an upper airfoil having an aerodynamically clean upper surface, the lower portions of said ducts forming a lower airfoil having an aerodynamically clean lower surface, and means connecting said upper airfoils to said lower airfoils;

deflectable flap means mounted adjacent the trailing edges of said upper airfoils;

a plurality of turbofans each comprising a turbine and a fan driven by said turbine and having a bypass ratio greater than 5 but less than 12;

each of said fans mounted in a respective one of said ducts and driving air over said airfoil and beneath said flap means;

each of said turbines mounted aft of the associated fan and exhausting hot gas beneath said upper airfoil and over said flap means;

gas generator means mounted in said fuselage; and means connecting said gas generator means to drive said turbines.

5. The airplane of claim 1 further comprising:

a plurality of movable door members cooperating to form said lower airfoils;

a plurality of movable vane members extending transversely across each of said ducts aft of said fan means, and means for adjustably positioning said door members and said vane members continuously between a first position and a second position to direct air driven by said fan means in a desired direction.

6. The airplane of claim 4 further comprising:

a plurality of movable door members cooperating to form said lower airfoils;

a plurality of movable vane members extending transversely across each of said ducts aft of said fan means; and means for adjustably positioning said door members, said vane members and said flap means continuously between a first position and a second position to direct exhaust from said turbofans in a desired direction.

7. The airplane of claim 1 further comprising:

a first pair of beam cap strips extending spanwise within said upper airfoil and each having one end thereof secured to said fuselage, a second pair of beam cap strips extending spanwise within said lower airfoil and each having one end thereof secured to said fuselage, one strip of each of said pairs being located adjacent said fan means, the other strip of each of said pairs being spaced rearwardly from said one strip, first strut means extending diagonally spanwise arcoss each of said ducts and connecting said one strip of each of said pairs, and second strut means extending diagonally chordwise across each of said ducts and connecting said other strip of each of said pairs.

References Cited

UNITED STATES PATENTS

| | | | |
|---|---|---|---|
| 2,168,726 | 8/1939 | Whittle | 60—262 |
| 2,479,487 | 8/1949 | Goembel | 244—15 |
| 2,929,580 | 3/1960 | Ciolkosz | 244—12 |
| 3,035,792 | 5/1962 | Klapproth | 244—15 |
| 3,068,647 | 12/1962 | Santamaria et al. | 244—15 |
| 3,093,349 | 6/1963 | Wagner | 244—42 |
| 3,154,267 | 10/1964 | Grant | 244—15 |

FOREIGN PATENTS

| | | |
|---|---|---|
| 277,349 | 11/1964 | Netherlands. |

MILTON BUCHLER, *Primary Examiner.*

LARRY C. HALL, ALFRED E. CORRIGAN,
*Examiners.*